2,999,746
SUPPRESSING POTATO SPROUTING BY THE VAPORS OF DIPROPARGYL ETHER

Frederick A. Hessel, Montclair, N.J., assignor to General Aniline & Film Corporation, New York, N.Y., a corporation of Delaware
No Drawing. Filed Dec. 2, 1958, Ser. No. 777,697
3 Claims. (Cl. 71—2.7)

The present invention relates to an improved method of suppressing or retarding the sprouting of potato tubers during storage.

There are currently available several methods of preventing the premature sprouting of potato tubers and of potatoes destined for human consumption while in storage. One method consists of dusting, either by hand or by mechanical means, of a composition consisting of 2,3,5,6-tetrachloronitrobenzene as the active component in an inert pulverulent carrier. Another dusting method consists of applying to the potatoes, particularly seed potatoes, 1,1,2,3,3,4,5,5-octachlorpentene-1 blended with an inert carrier such as talcum powder. Still another method consists of dusting potatoes with a spray or dust with a phenolic ether such as p-bromo-diphenyl ether, $\gamma$-bromopropyl phenol ether, iso-eugenol methyl ether and the like. All of these methods possess an inherent shortcoming in that there is present a distinct possibility that the ultimate consumer may receive potatoes destined for human consumption whose skins are contaminated by the anti-sprouting agent, and as a consequence may lead to health problems. It has been established that the various anti-sprouting agents currently employed possess toxicity to human beings. When employed in concentrations to prevent anti-sprouting, the toxicity may be suffiicently low. However, there is a possibility that if the repeated consumption of such treated potatoes is continued, the body intake of the various anti-sprouting agents may accumulate in time to manifest definite toxic effects.

In order to overcome the health problems of the foregoing anti-sprouting agents, it has been proposed to employ the vapors of saturated aliphatic alcohols. The use of such vapors would obviate any possibilities of the potato skins subsequently being contaminated. While various aliphatic saturated alcohols have been tested, amyl and nonyl alcohols have shown considerable promise of being applicable on a commercial scale in the suppression of the sprouting of potato tubers and potatoes in general by the vapor of dipropargyl ether.

Other objects and advantages will become more clearly evident from the following disclosure.

I have found that in comparative experiments that the vapor of dipropargyl ether having a boiling point of 118/119° C., is much more effective in completely preventing the sprouting of potato tubers than either the amyl or nonyl alcohols previously recommended. In addition, I have found that the amount of dipropargyl ether absorbed or adsorbed by the potato tuber or potato is practically nil and as a consequence does not involve any health problem.

To demonstrate the effectiveness and the lack of absorption of dipropargyl ether on treated potato tubers and potatoes, I employed an edible Maine potato (*Solanum tuberosum*) grade I of approximately the same size. I conducted my experiments over a period of 45 days at a temperature of 60° F. and 35% relative humidity. To illustrate the practice of my improved method, the following example is given.

Example

Into each of 4 identical cardboard boxes of 15.5" x 12" x 10", provided with a cover, there were placed 4 potatoes in the center of each. Into the first box numbered experiment 1 as control, there was placed a small dish at one end containing 50 cc. of water. Into the remaining 3 boxes there were placed the same small dishes at one end each containing 50cc. of amyl alcohol, nonyl alcohol and dipropargyl ether, respectively. In addition, each of the remaining 3 boxes also had in each a small dish containing 50 cc. of water. The 4 boxes were then closed except for a vent of 1/8" running the whole length of the top cover (15.5"). The 4 boxes were then placed in a semi-dark cellar with an average temperature of 60° F. and a relative humidity of 35%. The boxes were examined every day, and if necessary, due to evaporation, the water or the alcohol replenished to maintain a constant volume of 50 cc. in each dish. After a period of 45 days, the boxes were opened, the sprouts were severed from each potato and the weight determined. The results obtained were as follows:

| Exp. No. | Chemical | Weight of Potatoes in Grams in Each Box | Weight of Sprouts in Grams |
|---|---|---|---|
| 1 | Control | 490.3 | 37.3 |
| 2 | Amyl Alcohol | 540.2 | 32.1 |
| 3 | Nonyl Alcohol | 535.4 | 28.9 |
| 4 | Dipropargyl Ether | 550.7 | 0 |

After termination of the foregoing experiments, the 4 potatoes treated with dipropargyl ether vapor were allowed to remain in the open air in a semi-dark cellar for a period of 24 hours. Two of the potatoes were then immediately planted in an open field and within a period of 10 days both germinated. The remaining 2 potatoes treated with dipropargyl ether vapors were boiled with their skin on in water for 45 minutes in a closed container. In lifting periodically no odor of dipropargyl ether was evident. The potatoes were then cut in half and the flavor of the meat compared with the blank run. No difference in taste was evident, thus clearly indicating that there was no absorption or adsorption of dipropargyl ether either by the skin or the meat of the potato.

From the foregoing experiments, it is clearly apparent that the method of the present invention is particularly adaptable for the application of dipropargyl ether in vapor form in the retarding or suppressing of the sprouting of potato tubers and potatoes. In the case of large containers such as warehouse storage bins and the like, the dipropargyl ether may be vaporized by heating and the air laden vapors circulated with fans to effect a suitable contact with the stored potatoes. In lieu thereof, mists or sprays of the dipropargyl ether may also be used with satisfactory results. In any case, it is recommended that a sufficient amount of air be allowed entrance to the storage or warehouse compartments to supply the necessary oxygen for respiration.

In the treatment of potatoes, the maximum amount of dipropargyl ether needed to completely retard and suppress the sprouting is about 1 part by weight per 1000 parts by weight of stored potatoes at a relative humidity of 50–70%.

I claim:
1. The method of retarding the sprouting of potatoes during storage which comprises exposing 1,000 parts by weight of said potatoes to 1 part by weight of the vapors of dipropargyl ether.
2. The method of retarding and suppressing the sprouting of potato tubers which comprises subjecting 1,000 parts by weight of the said tubers to 1 part by weight of the vapors of dipropargyl ether.

3. A method of suppressing premature sprouting of seed potatoes which comprises exposing 1,000 parts by weight of said potatoes to 1 part by weight of the vapors of dipropargyl ether.

References Cited in the file of this patent

UNITED STATES PATENTS 2,801,160    Iserson    July 30, 1957

FOREIGN PATENTS 721,208    Great Britain    Jan. 5, 1955
732,163    Great Britain    June 22, 1955

OTHER REFERENCES

Emilson in "Chemical Abstracts," vol. 50, col. 17295(d).

"Science News Letter," vol. 70, No. 5, Aug. 4, 1956, page 70.